United States Patent Office 3,034,955
Patented May 15, 1962

3,034,955
ARYL SULPHONAMIDE INSECTICIDES
Wilhelm Ernst Frick, Birsfelden, Basel Land, and Walter Stammbach, Basel, Switzerland, assignors to J. R. Geigy A.G., Basel, Switzerland
No Drawing. Filed Sept. 8, 1958, Ser. No. 759,430
Claims priority, application Switzerland Sept. 10, 1957
21 Claims. (Cl. 167—37)

The present invention concerns new aryl sulphonic acid arylamides having valuable insecticidal properties, processes for the production thereof as well as their use for the protection of keratine material from decomposition by injurious pests. It also concerns, as industrial product, the keratine material protected from decomposition by injurious insects by the use of these compounds.

Various suggestions have already been made for the use of substances which contain sulphonamide groups as insecticides, in particular for the protection of wool and other keratine material from attack by injurious pests. Known compounds of this type however, have the great disadvantage that they develop a sufficient action only against individual types of textile pests, chiefly against the larvae of the clothes moth (*Tineola biselliella*) whilst other equally important textile pests, in particular the larvae of fur and carpet beetles (*Attagenus piceus* and *Anthrenus vorax*) are much less sensitive to these compounds. Thus from the first, no attempt could be made to protect textiles from attack by these organisms, or uneconomically large amounts of the compounds which are active chiefly against the clothes moth must be used in order to attain a certain protective action against the types of beetles mentioned also.

It has now surprisingly been found that aryl sulphonic acid arylamides of the general formula:

wherein $Ar_1$ and $Ar_2$ represent phenyl radicals which together contain at least one trifluoromethyl radical and at least one halogen atom as substituents and which, if desired, can be substituted by other halogen atoms, nitro groups and/or by alkyl radicals bound direct or by way of an oxygen atom, and
R represents hydrogen or an alkyl radical, have an excellent insecticidal action not only against the clothes moth and the various stages of development thereof but also against the larvae of the types of beetles mentioned above.

The compounds defined above can be produced in a simple manner by reacting an aryl sulphonic acid or aryl sulphenic acid halide of the general formula:

or

with an arylamine of the general formula:

wherein Hal represents chlorine or bromine and $Ar_1$, $Ar_2$ and R have the meanings given above. The reaction components are so chosen that at least one of the radicals $Ar_1$ and $Ar_2$ contains at least one trifluoromethyl group as substituent, and the reaction is performed, if necessary, in the presence of an acid binding agent. If desired, the reaction products obtained in which R is hydrogen, are then treated in the presence of an acid binding agent or after conversion into an alkali metal salt, with a reactive ester of an alkanol. Then, or instead of the substitution in the sulphonamide group, reaction products in which $Ar_1$ and $Ar_2$ contain no or only a few halogen atoms as substituents are reacted, if desired, with chlorine or bromine, and any aryl sulphenic acid arylamides are treated with oxidising agents.

The reaction of the aryl sulphonic acid or aryl sulphenic acid halides with the arylamines need not be performed in the presence of acid binding agents; both reaction components are reacted advantageously at a raised temperature, possibly in an inert organic solvent as reaction medium. At lower temperatures the reaction can be performed in the presence of an acid binding agent. In a non-aqueous medium examples of such are an excess of the arylamine to be condensed or tertiary organic bases such as, for example, pyridine, dimethyl aniline or triethylamine. If desired, these can also serve as solvents; the condensation can also be performed however, in an inert organic solvent such as, for example, benzene, chlorobenzene, toluene, chloroform or diethyl ether.

The reaction can also be performed in an aqueous medium, inorganic bases of the most various type such as, for example, alkali and earth alkali hydroxides, alkali carbonates, hydrogen carbonates, phosphates or acetates being used as acid binding agents. It is also possible to use solid ion exchangers to bind the hydrohalogenic acid liberated during the reaction.

Examples of aryl sulphonic acid halides suitable as starting products are the chlorides and bromides of 4-chlorobenzene sulphonic acid, 3.4-dichlorobenzene sulphonic acid, 2.3.4-trichlorobenzene sulphonic acid, 2.4.5-trichlorobenzene sulphonic acid, 4-bromobenzene sulphonic acid, 3-trifluoromethyl-benzene sulphonic acid, 3-trifluoromethyl-4-chlorobenzene sulphonic acid, 2.4-dichloro-5-trifluoromethyl benzene sulphonic acid, 2.5-dichloro-4-trifluoromethyl-benzene sulphonic acid, p-toluene sulphonic acid, 3-nitrobenzene sulphonic acid and of 3-nitro-4-chlorobenzene sulphonic acid.

However, also chlorides of aryl sulphenic acids can be used such as, e.g. 4-chlorobenzene sulphenyl chloride, 3.4-dichlorobenzene sulphenyl chloride, 2.4.5-trichlorobenzene sulphenyl chloride, 2-nitro-4-chlorobenzene sulphenyl chloride and 2-nitro-4.5-dichlorobenzene sulphenyl chloride.

Such acid halides can be reacted for example with 4-chloroaniline, 3.4-dichloroaniline, 3 - trifluoromethyl-4-chloraniline, 2.3.4-trichloraniline, 2.4-dichloro-3-trifluoromethyl aniline, 2.5-dichloro-4 - trifluoromethyl aniline, 2.3.4.5-tetrachloraniline, 2-trifluoromethyl-4-chloraniline, 2-nitro-4-trifluoromethyl aniline, 2.4.5-trichloraniline, 3.4-dichloro-o-toluidine, 2.4-dichloro-5 - trifluoromethyl aniline, 2-amino-4.5-dichloranisol, 2-amino-4-chloranisol, 2-amino-4-trifluoromethyl anisol and 3.5-bis-(trifluoromethyl)-aniline, as well as with the N-methyl and N-ethyl derivatives of these primary amines.

Instead of reacting previously formed aryl sulphenyl halides with the amines defined, also the corresponding mercaptans can be treated with solutions of alkali hypochlorites in the presence of the amine to be acylated so that, after sulphenyl halides are formed as intermediate products, the desired aryl sulphenic acid arylamides are obtained.

The alkyl radical R can be subsequently introduced into aryl sulphonic acid arylamides having a monosubstituted amide group by reacting such aryl sulphonic acid arylamides in aqueous alkaline solution with dimethyl sulphate or diethyl sulphate, or by reacting the alkali metal salts thereof, suspended in organic solvents, with halides such as, for example, butyl bromide.

The aryl sulphenic acid arylamides can be oxidised for example by treatment with potassium permanganate in acetone solution at room temperature.

The compounds of the general Formula I produced according to the present invention are relatively only slightly toxic to warm blooded animals. They have considerable fastness to washing on keratine fibres and are excellently suitable for the protection of material consisting of keratine fibres in the natural or treated state, for example, of sheep's wool in the natural or treated state as well as other animal hairs, fells, or furs, from attack by clothes moths and textile beetles. As they have considerable fastness to washing on wool, it is possible to attain with them not only a temporary impregnation but also a lasting moth proofing action on keratine textiles such as blankets, woollen carpets, woollen underclothes, woollen top clothes and knitted goods. If the compounds contain a hydrogen atom in the amide group, i.e. if R represents a hydrogen atom, then in the form of their alkali metal salts, they generally dissolve well in water. They can be applied direct from these solutions onto keratine material by soaking the material for a shorter or longer time in the alkali metal salt solutions or spraying it with the alkali metal salt solutions or treating the material in the alkali metal salt solutions at a raised temperature as in dyeing processes. Compounds which contain no hydrogen atom in the amide group can be drawn on to the keratine material to be protected from their aqueous suspensions or emulsions, advantageously at a raised temperature or such suspensions or emulsions can be sprayed onto the keratine material. Because of the greater solubility of the compounds in organic solvents, they are particularly suitable for incorporation into organic solvents. The solutions obtained can either be used simply for impregnating the material to be protected or, with a suitable choice of solvent and concentration of active ingredient, they can also be used for example as dry cleaning agents.

Those compounds of the general Formula I which contain in both phenyl groups a trifluoromethyl radical and which contain one to two chlorine atoms in both phenyl groups as substituents are particularly suitable as active ingredients against pests which are injurious to keratine fibres. There may also be two trifluoromethyl groups in the anilide radical.

First the production according to the present invention of the new aryl sulphonic acid arylamides and then their use for the protection of keratine material are described in more detail in the following examples. In all the examples, parts are given as parts by weight and their relationship to parts by volume is as grammes to cubic centimetres. The temperatures are in degrees centigrade.

*Example 1*

58.8 parts of 2.4.5-trichloraniline are dissolved in 180 parts of pyridine. 93 parts of 3-trifluoromethyl-4-chlorobenzene sulphonic acid chloride are added dropwise while stirring and cooling well, the temperature not being allowed to rise over 0°. On completion of the dropwise addition of the sulphonic acid chloride, the mixture is warmed to room temperature. After 8 hours, the mixture is warmed to 70–75° and left at this temperature for 8 hours.

On cooling, the reaction mixture is diluted with about 200 parts of water and the reaction is made strongly alkaline with caustic soda lye whereupon the mixture is distilled with steam. 3-trifluoromethyl-4-chlorobenzene sulphonic acid-2'.4'.5'-trichloranilide is precipitated from the distillation residue with diluted hydrochloric acid. After filtering and drying, it is a grey powder which dissolves easily in caustic soda lye without leaving a residue.

The compound is obtained in completely pure form by recrystallisation from carbon tetrachloride. It melts then at 146–148°.

Under the same reaction conditions, on using stoichiometrical amounts of 2-amino-4-trifluoromethyl anisol and 3.4-dichlorobenzene sulphonic acid chloride, 3.4-dichlorobenzene sulphone-2'-methoxy - 5' - trifluoromethyl anilide (M.P. 100–102°) is obtained; on using stoichiometrical amounts of 2-amino-4-trifluoromethyl anisol and 3-trifluoromethyl-4-chlorobenzene sulphonic acid chloride, 3- trifluoromethyl-4-chlorobenzene sulphone-2'-methoxy - 5'- trifluoromethyl anilide (M.P. 95–97°) is obtained; on using stoichiometrical amounts of 2-amino-4-chloroanisol and 3-trifluoromethyl - 4 - chlorobenzene sulphonic acid chloride, 3-trifluoromethyl-4-chlorobenzene sulphone - 2'-methoxy-5'-chloranilide (M.P. 148–150°) is obtained; on using stoichiometrical amounts of 2-amino-4.5-dichloranisol and 3-trifluoromethyl - 4 - chlorobenzene sulphonic acid chloride, 3 - trifluoromethyl - 4 - chlorobenzene sulphone-2' - methoxy - 4'.5' - dichloranilide (M.P. 126–128°) is obtained and on using stoichiometrical amounts of 3.5-bis-(trifluoromethyl)-aniline and 3-trifluoromethyl-4-chlorobenzene sulphonic acid chloride, 3-trifluoromethyl-4-chlorobenzene sulphone - 3'.5'-bis - (trifluoromethyl)-anilide (M.P. 111–113°) is obtained.

*Example 2*

(a) 44 parts of 3-trifluoromethyl-4-chlorobenzene sulphone-2'.4'.5'-trichloroanilide obtained according to Example 1 are suspended in 250 parts of water and 48 parts of 30% caustic soda lye are added to the suspension. 25 parts of dimethyl sulphate are added dropwise at 60–65° to the resultant solution and the reaction mixture is stirred for 3 hours at this temperature. On cooling, the precipitated product is filtered off and dried in the usual way. After recrystallising from ligroin, the 3-trifluoromethyl-4-chlorobenzene sulphonic acid - N - methyl-2'.4'.5'-trichloranilide melts at 121–123°.

(b) The same compound can be obtained as follows: 63 parts of 2.4.5-trichloro-N-methyl aniline are dissolved in 100 parts of dimethyl aniline and 150 parts of benzene and the solution is cooled to 5°. At this temperature, 93 parts of 3-trifluoromethyl-4-chlorobenzene sulphonic acid chloride are so added dropwise that the temperature does not exceed 10°. After the dropwise addition of the sulphonic acid chloride, the mixture is warmed to 20° and left for about 5 hours at this temperature; it is then warmed to 65–70° and kept for 8 hours at this temperature.

After cooling, the reaction mixture is poured onto ice and diluted hydrochloric acid. The benzene phase is removed, washed several times with water, dried and concentrated. The residue solidifies in crystalline form and proves to be identical in every respect to the product produced according to (a).

*Example 3*

68.7 parts of 2.4-dichloro-5-trifluoromethyl aniline are dissolved in 200 parts of acetone and the solution is diluted with 150 parts of water. 93 parts of 3-trifluoromethyl-4-chlorobenzene sulphonic acid chloride are added dropwise at 50–55° to this solution. At the same time 60 parts of 15% caustic soda lye are so added dropwise that the reaction mixture constantly remains weakly alkaline. After stirring for an hour at 50°, the reaction of the mixture is made strongly alkaline by the addition of 30 parts of 30% caustic soda lye. It is then distilled with steam. The residue is acidified with hydrochloric acid and the precipitate is filtered off and washed with water. After drying, the 3-trifluoromethyl-4-chlorobenzene sulphonic acid-2'.4'-dichloro-5-trifluoromethyl anilide so obtained is a grey powder. It can be recrystallised from carbon tetrachloride and then melts at 142–145°.

Analogously to Example 2 under (a), this compound can also be reacted with the most various alkylating agents, for example with dimethyl sulphate, diethyl sulphate, butyl bromide.

The corresponding compound having an n-butyl radical at the nitrogen atom can be produced as follows: 47.2 parts of 3-trifluoromethyl-4-chlorobenzene sulphone-2'.4'-dichloro-5'-trifluoromethyl anilide (produced according to Example 3) are dissolved in 300 parts of dioxan and 17 parts of 30% caustic soda lye are added. 16 parts of n-butyl bromide in 32 parts of dioxan are added dropwise at 90° within 5 hours. The reaction mixture is then stirred for 15 hours at 90°, diluted with water and, on the reaction being made alkaline, treated with steam. The oily residue is then separated from the aqueous phase, and dried in the vacuum. The dried oily residue is then crystallised from petroleum ether. The 3-trifluoromethyl-4-chlorobenzene sulphone-2'.4'-dichloro-5'-trifluoromethyl-N-n-butyl anilide obtained in the form of a white powder melts at 96–98°.

Also, for example, 3.4-dichlorobenzene sulphonic acid-2'-trifluoromethyl-4'-chloranilide (M.P. 112–114°), 3-trifluoromethyl-4-chlorobenzene sulphonic acid - 2' - trifluoromethyl-4'-chloranilide (M.P. 106–108°), 3.4-dichlorobenzene sulphonic acid-2'.5'-dichloro - 4' - trifluoromethyl anilide (M.P. 139–141°), 3-trifluoromethyl-4-chlorobenzene sulphonic acid-2'.5'-dichloro-4'-trifluoromethyl anilide (M.P. 126–128°), 3-trifluoromethyl-4-chlorobenzene sulphonic acid-2'-nitro-4'-trifluoromethyl anilide (M.P. 151–153°), 2.4.5-trichlorobenzene sulphonic acid-2'-chloro-5'-trifluoromethyl anilide (M.P. 106–108°), 3-trifluoromethyl-4-chlorobenzene sulphonic acid-2'.3'.4'-trichloranilide (M.P. 131–133°), and 3-trifluoromethyl-4-chlorobenzene sulphonic acid-3'-trifluoromethyl-4'-chloranilide (M.P. 143–145°) are obtained in the manner described in the above examples.

*Example 4*

The new insecticidal compounds in which R is hydrogen can be used, for example, in the following manner:

0.8 part of active ingredient, for example 3-trifluoromethyl-4-chlorobenzene sulphonic acid-2'.5'-dichloro-4'-trifluoromethyl anilide, are suspended in 200 parts of water and dissolved with the addition of 5 parts by volume of 1 N-caustic soda lye. The solution is diluted with 3000 parts of water and 100 parts of wool are treated in this liquor for 30 minutes at 60°. After rinsing and drying in the usual manner, the wool proves to be excellently fast to attack by larvae of both the clothes moth as well as of the fur and carpet beetle.

The tests were performed according to the method of the Swiss Association for Standardisation (SNV 95901 and 95902).

*Example 5*

Two possibilities for the use of compounds in which R does not represent hydrogen are further illustrated below.

(a) 1.20 parts of active ingredient, for example 3-trifluoromethyl-4-chlorobenzene sulphonic acid-N-methyl-2'.4'.5'-trichloranilide, are dissolved in 100 parts by volume of alcohol. This solution is poured into a solution of 5 parts of sulphated castor oil in 4000 parts of water while stirring. 100 parts of wool flannel are treated for an hour at 100° in the suspension obtained. The fabric is then rinsed and dried in the usual way. On testing, the fabric is excellently proofed against moths and beetles.

(b) The same active ingredient can also be applied while dry cleaning:

10 parts of active substance are first dissolved in 25 parts by volume of methoxyethanol and this solution is then diluted with 1000 parts by volume of a benzine fraction (for example "Diluan S") suitable for dry cleaning.

The textiles to be treated are dipped in this solution, then squeezed out to 100% content of solvent and dried. After this treatment they prove to be resistant to attack both by moth larvae as well as by fur and carpet beetle larvae.

What we claim is:

1. Aryl sulphonarylamides of the general formula

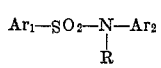

wherein
Ar₁ and Ar₂ each represents a phenyl radical substituted by members selected from the group consisting of hydrogen, halogen and trifluoromethyl, nitro, alkyl and alkoxy radicals, at least one trifluoromethyl radical and at least one halogen atom being present as substitutents in any of these phenyl radicals, and
R represents a member selected from the group consisting of hydrogen and alkyl radicals.

2. Aryl sulphonarylamides of the general formula

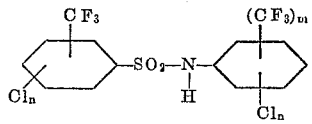

wherein
n is a whole number from 1 to 2, and
m is a whole number from 1 to 2.

3. Aryl sulphonylarylamides of the general formula

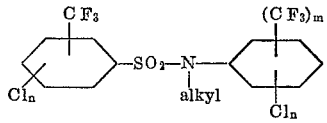

wherein n is a whole number from 1 to 2, and m is a whole number from 1 to 2.

4. The compound 3-trifluoromethyl - 4 - chlorobenzene sulphonic acid-2'.4'.5'-trichloranilide.

5. The compound 3-trifluoromethyl - 4 - chlorobenzene sulphonic acid-2'.4'.5'-trichloro-N-methyl anilide.

6. The compound 3-trifluoromethyl - 4 - chlorobenzene sulphonic acid-2'.4'-dichloro-5'-trifluoromethyl anilide.

7. The compound 3-trifluoromethyl - 4 - chlorobenzene sulphonic acid-2'.4'-dichloro - 5'-trifluoro - N-n-butyl anilide.

8. The compound 3.4-dichlorobenzene sulphonic acid-2'-trifluoromethyl-4'-chloranilide.

9. The compound 3-trifluoromethyl - 4 - chlorobenzene sulphonic acid-2'-methoxy-4'.5'-dichloranilide.

10. The compound 3-trifluoromethyl-4 - chlorobenzene sulphonic acid-3'.5'-bis-(trifluoromethyl)-anilide.

11. The compound 3-trifluoromethyl-4 - chlorobenzene sulphonic acid-2'-trifluoromethyl-4'-chloranilide.

12. The compound 3.4-dichlorobenzene sulphonic acid-2'.5'-dichloro-4'-trifluoromethyl anilide.

13. The compound 3-trifluoromethyl-4 - chlorobenzene sulphonic acid-2'.5'-dichloro-4'-trifluoromethyl anilide.

14. The compound 3-trifluoromethyl-4 - chlorobenzene sulphonic acid-2'-nitro-4'-trifluoromethyl anilide.

15. The compound 2.4.5 - trichlorobenzene sulphonic acid-2'-chloro-5'-trifluoromethyl anilide.

16. The compound 3-trifluoromethyl-4 - chlorobenzene sulphonic acid-2'.3'.4'-trichloranilide.

17. The compound 3-trifluoromethyl-4 - chlorobenzene sulphonic acid-3'-trifluoromethyl-4'-chloranilide.

18. The compound 3,4-dichlorobenzene sulphonic acid-2'-methoxy-5'-trifluoromethyl anilide.

19. The compound 3-trifluoromethyl-4 - chlorobenzene sulphonic acid-2'-methoxy-5'-trifluoromethyl anilide.

20. The compound 3-trifluoromethyl-4 - chlorobenzene sulphonic acid-2'-methoxy-5'-chloranilide.

21. Process for the protection of keratine material from injurious insects which comprises applying on the keratine fibres and on textiles containing keratine, a compound of the general formula

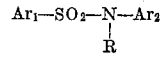

wherein
Ar₁ and Ar₂ each represents a phenyl radical substituted by members selected from the group consisting of hydrogen, halogen and trifluoromethyl, nitro, alkyl and alkoxy radicals, at least one trifluoromethyl radical and at least one halogen atom being present as substitutents in any of these phenyl radicals, and
R represents a member selected from the group consisting of hydrogen and alkyl radicals.

(References on following page)

References Cited in the file of this patent

UNITED STATES PATENTS

| | | |
|---|---|---|
| 800,913 | Herzberg | Oct. 3, 1905 |
| 1,962,276 | Huismann | June 12, 1934 |
| 2,392,733 | Goddin | Jan. 8, 1946 |
| 2,409,883 | Migrdichian | Oct. 22, 1946 |
| 2,435,274 | Hester | Feb. 3, 1948 |
| 2,450,777 | Allen | Oct. 5, 1948 |
| 2,577,256 | Lundsted | Dec. 4, 1951 |
| 2,759,019 | Brown | Aug. 14, 1956 |
| 2,867,658 | Frick | Jan. 6, 1959 |
| 2,921,945 | Adams | Jan. 19, 1960 |
| 2,937,202 | Slogh | May 17, 1960 |

FOREIGN PATENTS

| | | |
|---|---|---|
| 1,058,008 | France | January 1956 |